C. B. WEAVER.
APPARATUS FOR MAKING IRREGULARLY SHAPED STAMPINGS.
APPLICATION FILED FEB. 25, 1915.
1,307,170.
Patented June 17, 1919.
6 SHEETS—SHEET 1.
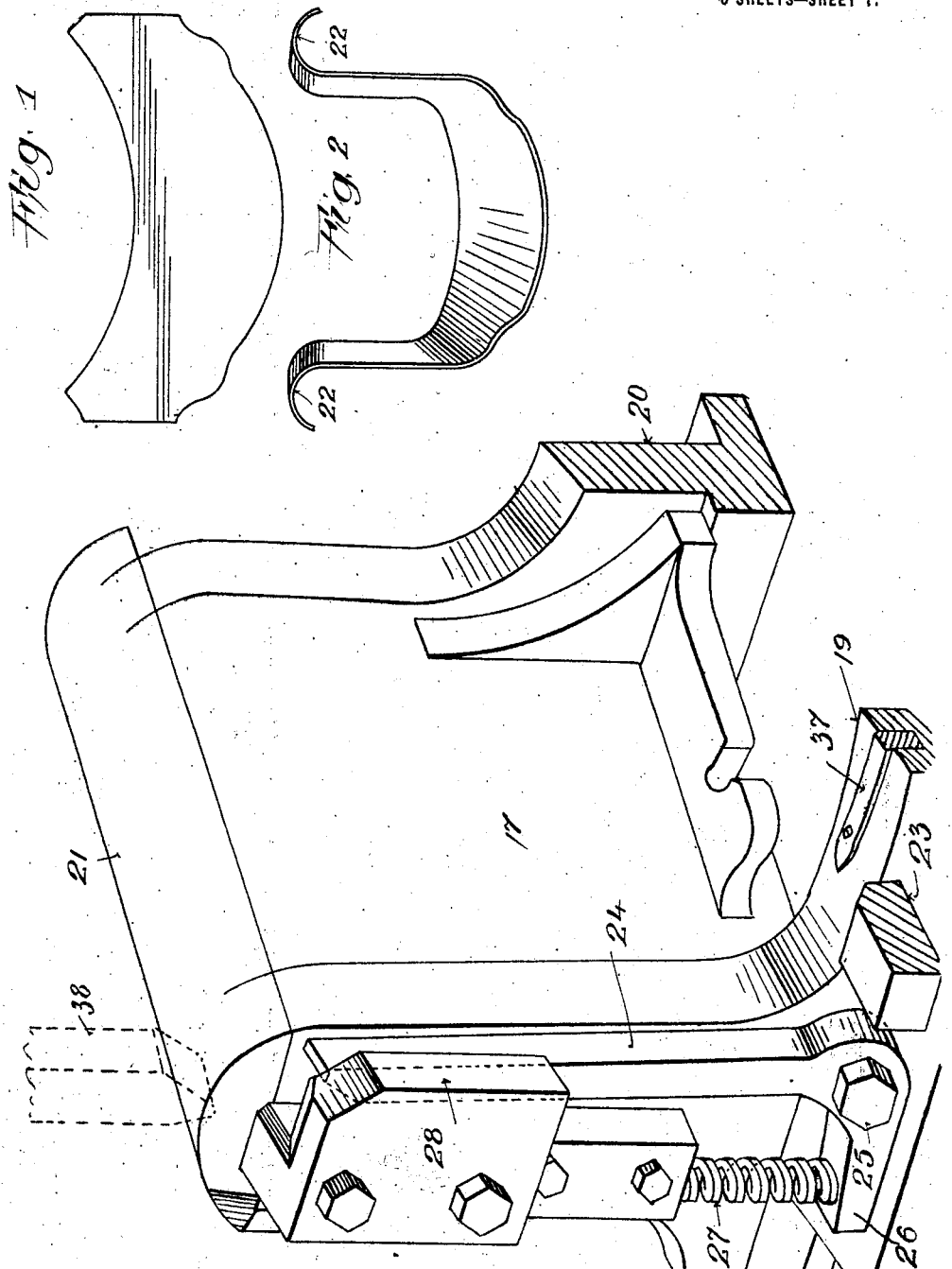

C. B. WEAVER.
APPARATUS FOR MAKING IRREGULARLY SHAPED STAMPINGS.
APPLICATION FILED FEB. 25, 1915.

1,307,170.

Patented June 17, 1919.
6 SHEETS—SHEET 2.

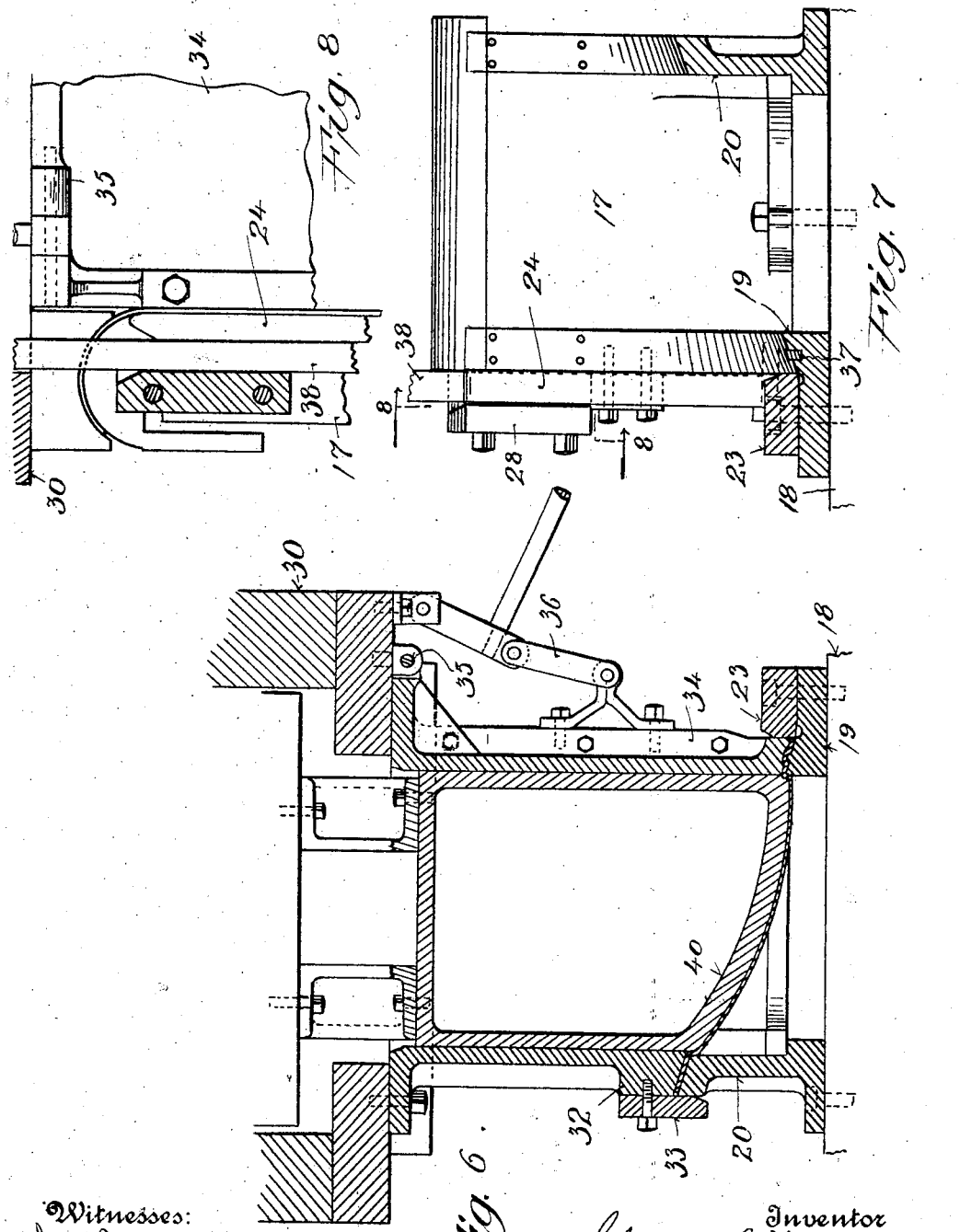

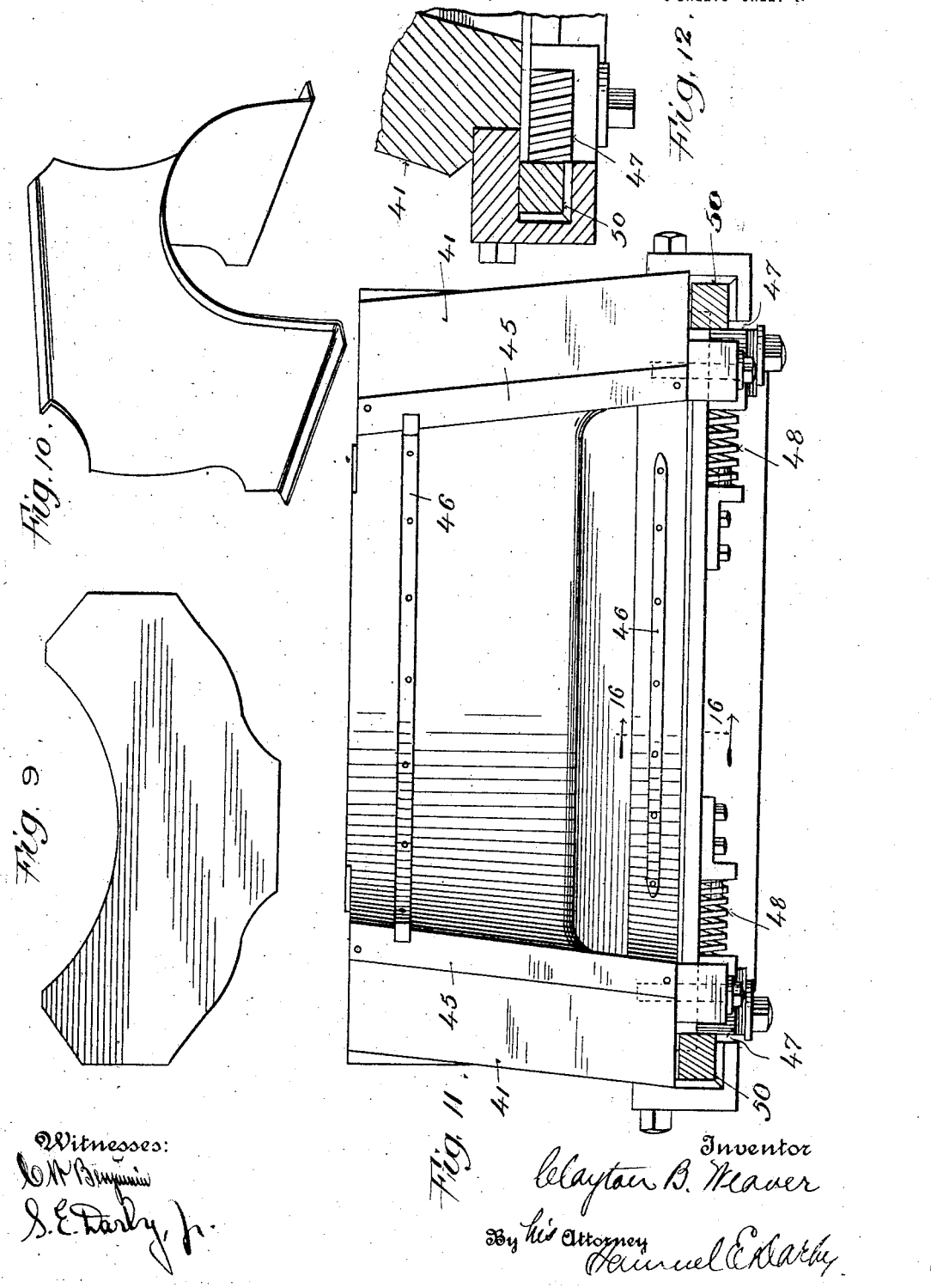

C. B. WEAVER.
APPARATUS FOR MAKING IRREGULARLY SHAPED STAMPINGS.
APPLICATION FILED FEB. 25, 1915.
1,307,170.
Patented June 17, 1919.
6 SHEETS—SHEET 5.
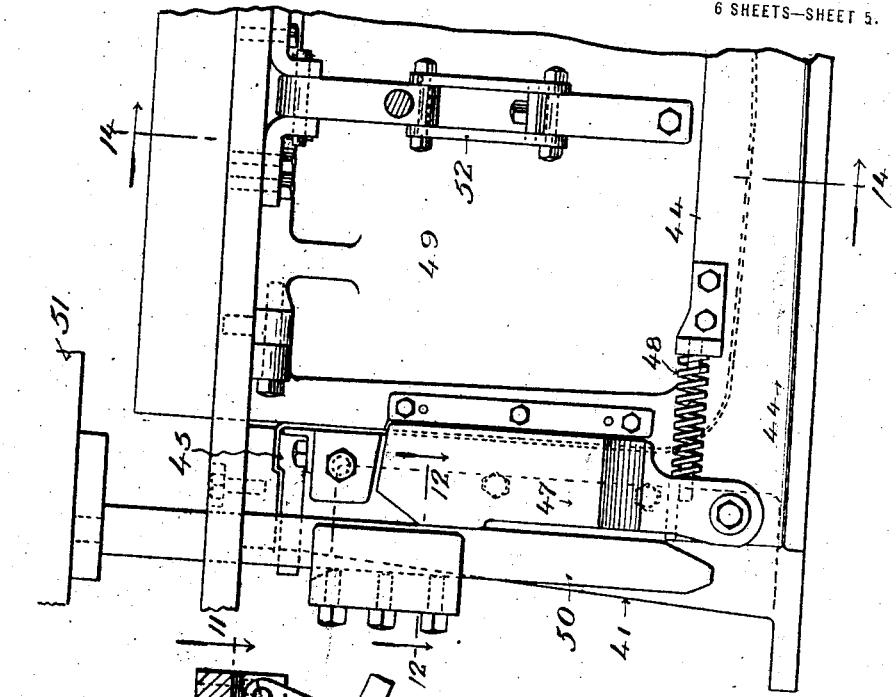
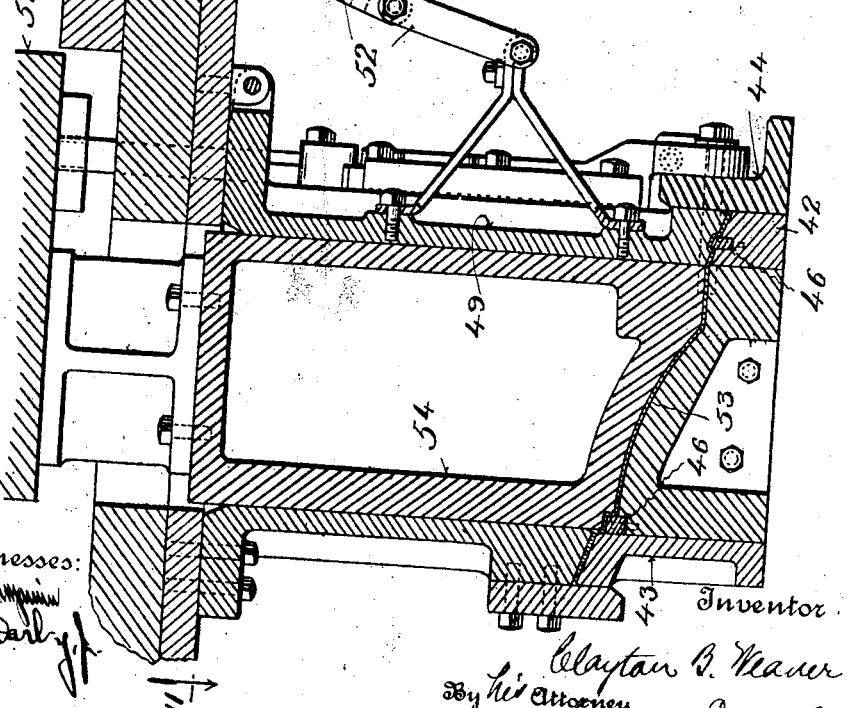

C. B. WEAVER.
APPARATUS FOR MAKING IRREGULARLY SHAPED STAMPINGS.
APPLICATION FILED FEB. 25, 1915.
1,307,170.
Patented June 17, 1919.
6 SHEETS—SHEET 6.
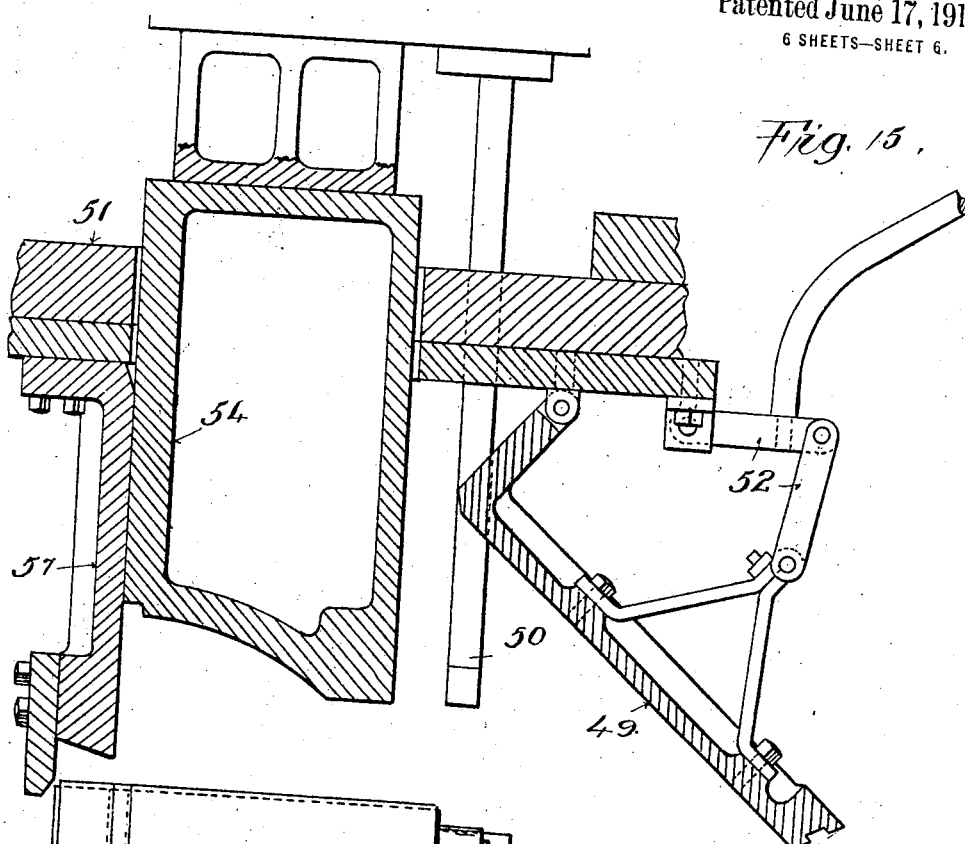
Fig. 15.
Fig. 16.
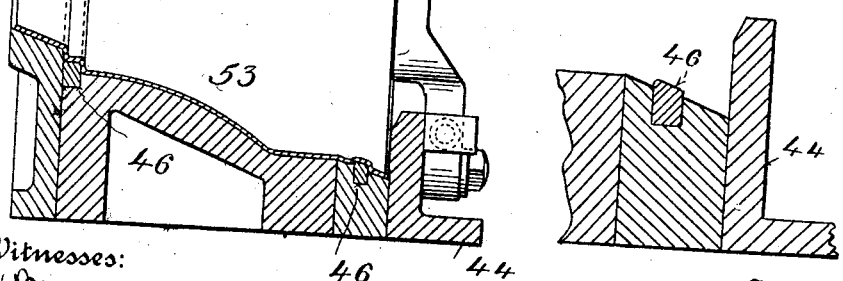

UNITED STATES PATENT OFFICE.

CLAYTON B. WEAVER, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

APPARATUS FOR MAKING IRREGULARLY-SHAPED STAMPINGS.

1,307,170. Specification of Letters Patent. Patented June 17, 1919.

Application filed February 25, 1915. Serial No. 10,455.

*To all whom it may concern:*

Be it known that I, CLAYTON B. WEAVER, a citizen of the United States, residing at Philadelphia, in the county of Philadelphia, State of Pennsylvania, have made a certain new and useful Invention in Apparatus for Making Irregularly - Shaped Stampings, of which the following is a specification.

This invention relates to the method and apparatus for making irregular shaped stampings.

The object of the invention is to provide an apparatus for making irregularly shaped stampings, which is simple in structure and mode of operation and efficient in operation.

A further object is to provide an apparatus of the character referred to for making large irregularly shaped sheet metal stampings at one stroke or operation.

A further object is to provide an apparatus of the character referred to wherein the sheet metal blank is stretched into the desired shape at one operation and without diminution of its thickness and without wrinkling.

Other objects of the invention will appear more fully hereinafter.

The invention consists substantially in the construction, combination, location, relative arrangement of parts and mode of operation, all as will be more fully hereinafter set forth, as shown in the accompanying drawings, and finally pointed out in the appended claims.

Referring to the accompanying drawings:—

Figure 1 is a plan view of a sheet of steel plate which has been trimmed to the desired outline preparatory to being stretched into the desired irregular shape in accordance with the principles of my invention.

Fig. 2 is a view showing the trimmed sheet stretched into the required shape to produce a portion of a sheet steel automobile body.

Fig. 3 is a view partly in perspective and parts in vertical transverse section, showing the work holder or seat in which the preliminarily trimmed and formed sheet is received and stretched into the required shape.

Fig. 6 is a view in vertical section on the line 6, 6, Fig. 5, showing the stretching die advanced to its position of full working stroke.

Fig. 7 is a view in vertical section on the line 7, 7, Fig. 4.

Fig. 8 is a broken view in section on the line 8, 8, Fig. 7, with the clamping and shaping or stretching dies lowered.

Fig. 9 is a view similar to Fig. 1 showing a blank steel sheet trimmed to the required outline to be stretched into shape to form another portion of a sheet steel automobile body in accordance with my invention.

Fig. 10 is a perspective view of a completed cowl.

Fig. 11, is a top plan view, partly in horizontal section on the line 11, 11, Fig. 14, of the work holder for producing the irregular stretched shape shown in Fig. 10.

Fig. 12 is a broken detail view in section on the line 12, 12, Fig. 13 looking in the direction of the arrows.

Fig. 13 is a view in front elevation, parts broken off, of the work holder shown in Fig. 11, the gate being closed and the clamping and stretching dies being advanced to the limits of their working stroke.

Fig. 14 is a view in vertical section on the line 14, 14, Fig. 13, looking in the direction of the arrows.

Fig. 15 is a view similar to Fig. 14, showing the clamping and shaping dies raised out of the work holder and the gate open.

Fig. 16 is a broken detail view in section on the line 16, 16, Fig. 11.

The same part is designated by the same reference numeral wherever it occurs throughout the several views.

Figure 4:
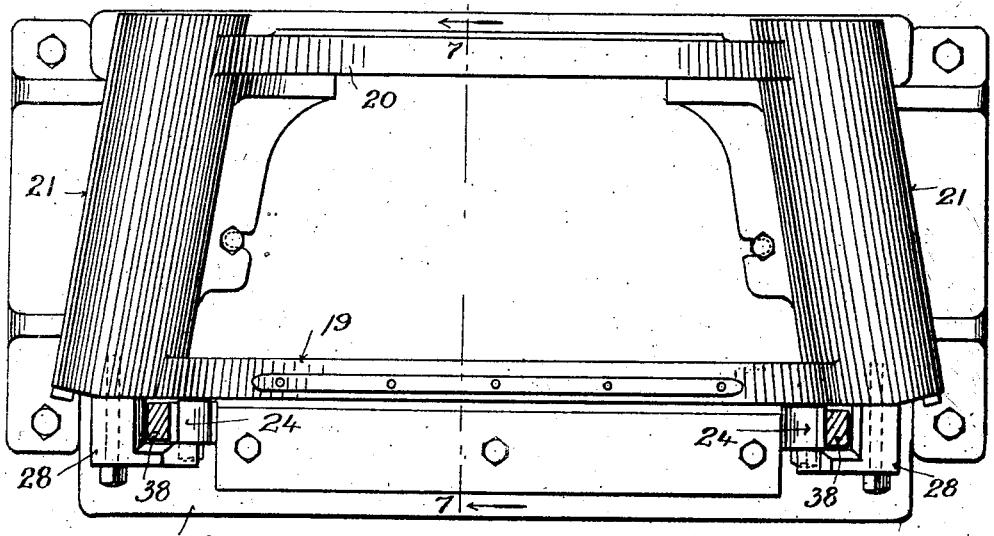
Fig. 4 is a view in top plan of the work holder or seat shown in Fig. 3 parts in section on the line 4, 4, Fig. 5.

Heretofore it has been the universal custom to produce by handwork large sheet steel stampings of irregular shape in the manufacture of automobile bodies, such as fenders, cowls, shrouds, or other portions or shells for such bodies. This method of producing such large irregularly shaped stampings is slow and exceedingly expensive and involves expensive and repeated handling and annealing of each individual piece. The use of different machines and dies through which such stampings are successively passed is equally objectionable inasmuch as such method involves unnecessary and repeated handlings of each individual piece, which greatly adds to the cost. The production of small sized stampings of irregular shapes has been attempted by making the dies in different pieces which are soldered together, the seams being painted over. The acid used in the solder, however, quickly rusts through the paint with the result that the product or stamping produced shows the line of the seams in the form of an uneven line or ridge. With the very best of care it is impossible to prevent the line of the seams of sectional dies from showing in the stampings produced. This trouble is greatly magnified in the production of large stampings and particularly in large stampings of irregular form such as fenders, shrouds, cowls and other portions of sheet steel automobile bodies, where symmetry of appearance is of the highest importance.

It is among the special objects of the present invention to provide an apparatus and method of operation wherein the objections above noted are obviated and eliminated, and large sheet steel stampings of irregular shape are produced in perfectly smooth contour and condition and at a single stroke of a single stretching or shaping die, thereby enabling me to produce the stampings quickly, easily and inexpensively, and avoiding the large expense incident to repeated handlings of individual pieces, as well as the danger of marring the appearance and smoothness of contour or surface of the stampings through unsightly ridges or outlines of die seams appearing therein.

In carrying out my invention the first step is to trim a sheet steel blank to the required outline as indicated in Figs. 1 and 9. The blank, thus trimmed, is then roughly bent by hand into the approximate shape of the work holder preliminary to being inserted in the work holder. The trimmed and preliminarily shaped blank is then placed in position in a suitable work holder and is securely clamped and held throughout the entire area thereof outside of the portion which is to be formed into the required irregular shape, and while so clamped and held the blank is acted upon by a single die, suitably shaped, applied to the unclamped area of the sheet, whereby the blank is stretched into the desired shape. In the stretching action which takes place when the die is applied to its work, the sheet is shaped into the required form but without decreasing the thickness thereof, which would be exceedingly objectionable, and also without increasing its thickness at any point which would be equally undesirable. The result of the operation is the production of a stamping stretched to the required irregular shape in beautifully smooth and finished condition, at a single stroke of the shaping die, and free from creases or wrinkles or the unsightly outline of die seams. The finished stamping is then removed from the work holder and another trimmed and preliminarily shaped blank is inserted and the operation repeated. Thus the stampings, in perfect order and condition are turned out rapidly and inexpensively.

The process described may be carried out in a wide variety of forms of apparatus. In the accompanying drawings I have shown constructions for turning out various irregular shapes of sheet steel stampings.

Figure 5:
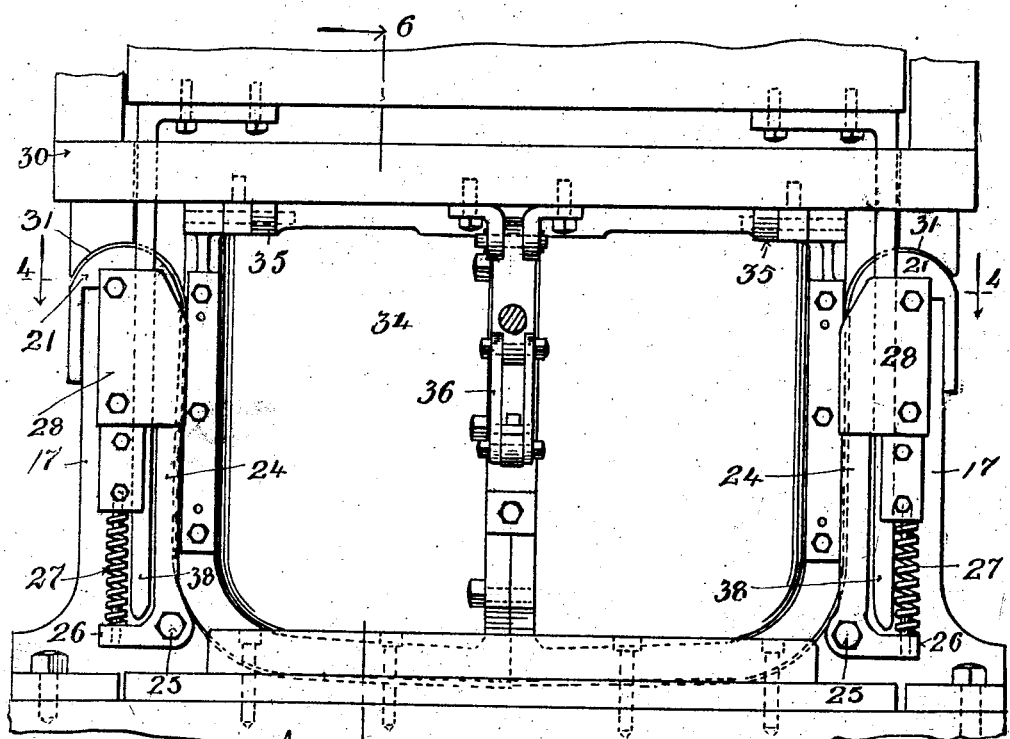
Fig. 5 is a view in front elevation of the construction shown in Fig. 4, with the clamping and shaping dies lowered and the gate closed.

Referring particularly to Figs. 3, 4, 5, 6, 7 and 8 I have shown a work holder which consists, essentially of side portions 17, in the form of vertical standards suitably bolted or otherwise anchored to a foundation 18. The side portions 17, of the work holder are connected together at their front and rear lower portions by cross members 19, 20, and at their upper horizontal edges said side members are curved to the desired shape, as indicated at 21, over which the bent ends 22 of the stampings are clamped and shaped during the action of the drawing die. The side members 17, and their front and rear cross connecting members 19, 20, constitute a holder into which the trimmed and preliminarily shaped blank is received. The front cross connecting member 19 preferably extends to a less height than the rear member 20, as clearly shown in Figs. 1, 6 and 7, which facilitates the introduction and seating of the blank in the holder. A horizontal retainer bar 23, is placed on the front cross connecting member 19. The front edge of the blank sheet fits down against the rear edge of this bar, and is retained in place thereby. Said bar also serves as a retainer stop for the door presently to be described. The blank, preliminarily bent into substantially U-shape with the end portions thereof bent over, is seated in the work holder above described with its bent end portions extending over the curved shaping surfaces 21 of the work holder sides. The rear edge of the blank is received and rests upon the upper edge or surface of the rear cross member 20 of the work holder, while the front edge of the blank rests upon the upper edge or surface of the front cross member 19, and against the rear edge of the retainer bar 23. In order to prevent the sheet or blank from being stretched into wrinkles or creases during the operation of the drawing or shaping die, presently to be described, it is essential that the blank be efficiently clamped and held along its horizontal as well as along its vertical edges. The upper surfaces of the front and rear cross connecting members 19, 20, and the curved upper edges or surfaces 21 of the side members 17, afford clamping surfaces for the horizontal portions or edges of the blank, against which the clamping die, presently to be described, acts. The vertical portions or edges of the blank are clamped and held in the following manner. At the front edge of each side portion 17 of the work holder is a vertical lever 24, pivotally mounted at its lower end, as indicated at 25. Each of these levers is provided with a tail extension 26 beyond its pivot point, against which acts a spring 27, the tension of which is normally exerted upon said levers to rock them laterally away from the edge of the blank seated in the work holder. Suitable keepers 28, bolted to the front ends of side members 17 engage over said levers 24, and serve as guides for the latter. When the clamping die member advances to its work the levers 24 are rocked inwardly into position against the vertical edges of the blank to clamp and hold the same against the vertical side edges of the door, presently to be described.

After the blank is properly seated in the work holder a clamping die operating in advance of the shaping and drawing die descends and engages the horizontal edges of the blank. This clamping die is indicated, generally, by reference numeral 30. It comprises the horizontal side portions 31 which are shaped to conform to the curvature of the surfaces 21 of the work holder and co-act therewith to clamp the bent over or curved end portions 22 of the blank therebetween. The clamping die also is provided with the rear member 32, see Fig. 6, which coöperates with the upper surface of the cross member 20, to clamp the rear horizontal edge of the blank therebetween. A retainer bar 33 is carried by the rear portion 32 of the clamping die and extends below the clamping surface of said portion and serves to prevent the blank from being displaced from proper position and relation as the clamping die advances to its work. A swinging door 34 is hinged along its upper horizontal edge at the front of the clamping die, the door hinges being indicated at 35. Any suitable means may be provided for swinging the door into open or closed position. A toggle lever arrangement for this purpose is shown and indicated at 36. After a blank is seated in the work holder and before the clamping die is advanced to its work, the door 34 is closed into the position shown in Fig. 6, and as the clamping die then advances to its work the lower edge of the door coöperates with the upper surface of the cross member 19 to clamp the front edge of the blank therebetween. If desired, and in order to insure an efficient clamping and gripping action upon this horizontal edge portion of the blank, a raised gripping strip 37, may be inserted in the upper surface of the cross member 19, as clearly shown. Carried by the clamping die at the front side edges thereof are vertically depending wedge members 38, which enter the space outside the clamp levers 24 and rock said levers at the opposite sides of the gate inwardly toward each other and against the vertical side edges of the gate with the result that said levers exert a clamping action to clamp the vertical front edges of the blank against the vertical side edges of the door.

After the clamping die has advanced to its work the shaping or drawing die, indicated, generally, at 40, Fig. 6, advances into the work holder and against the unclamped area of the blank. This stretching die is formed in one single piece on its working surface which is shaped to the desired configuration according to the character of the stamping to be produced. It works inside the clamping die and as it advances to its work it penetrates into the work holder and engages the unclamped area of the blank and stretches the same into the desired configuration. This action does not cause the sheet to be reduced nor to be increased in thickness at any point but it does cause the same to be stretched smoothly into the required shape without wrinkles or creases.

After the stretching die has completed its working stroke the clamping die is withdrawn and then the stretching die is withdrawn, and finally the gate opened and the stretched stamping is removed and replaced by another blank. The operation described is then repeated.

The important problem involved is the stretching of a large sheet steel blank into an irregularly shaped product. This is accomplished according to the method and apparatus above described by firmly and efficiently clamping the edges of the blank and then applying the stretching die to the unclamped area of the blank which is to be stretched into the required shape. The action of the stretching die causes the metal of the blank to be drawn from all directions while being formed into the desired shape. The operation is accomplished rapidly a complete product being turned out at each stroke of the dies. Any suitable mechanism may be employed for actuating the dies in the performance of their work.

It will be seen from the foregoing description that the blank sheet is clamped at its edges in different horizontal planes. By reason of this I am enabled to secure the stretching action upon the blank by the shaping die which forms the same into the desired irregular shape.

It will also be seen that the stretching die works inside and is guided by the clamping die.

It is not essential that the clamping die be provided with a hinged door, as the clamping levers 24, 24, may operate against any suitable or convenient abutment, forming part of or carried by the clamping plunger.

In Figs. 11 to 16 I have shown an arrangement such as is required to produce a shape or drawn stamping of the form shown in Fig. 10. In this arrangement similar features and operations remain essentially the same as above described. The work holder has the side members 41 and the cross connecting members 42, 43, with a front retaining bar 44. Instead of the upper edges of the side portions of the work holder being rounded as are the surfaces 21 above described, said edges are in the form of flat surfaces with a rib 45, and gripping ribs 46 are respectively seated in the clamping face of the cross member 42 at one edge of the base part of the work holder, and in the other edge of said base part. The clamp levers 47 for the vertical edges of the blank are somewhat differently shaped from the levers 24, above described, but they are pivotally mounted in the same manner, with springs 48 acting thereon and may be forced into coöperating clamping action against the vertical edges of the door 49 by means of depending arms 50 on the clamping plunger 51, in the same manner as above described. The door 51 is opened and closed by toggle levers 52, and the clamping plunger 51 operates to clamp the edges of the blank in the same manner as above described. In the production of the stamping in this instance, however, the work holder is provided with a bottom surface 53 of the required configuration with which coöperates a co-acting and correspondingly shaped surface on the stretching die 54, in order to produce the required configuration in the finished stamping. The operation and principle of action remains the same as that above described with reference to Figs. 3 to 9.

Having now set forth the objects and nature of my invention, and the manner of carrying the same into practical operation, what I claim as new and useful and of my own invention, and desire to secure by Letters Patent is:—

1. In an apparatus for producing large sheet metal stampings of irregular shape, a work holder to receive the blank to be stamped, means for clamping the blank along and throughout the edges thereof, and a convexed stretching die adapted to operate against the unclamped area of the blank to stretch the same throughout such area into the desired shape, the shaping of the sheet metal being accomplished solely by the action of the stretching die.

2. In an apparatus for producing large sheet metal stampings of irregular shape, a work holder having side portions and cross connecting members to receive the blank to be stretched, in combination with a clamping die adapted to coöperate with said side portions and cross connecting members to clamp the edges of the blank therebetween, and a forming and stretching die convexed on its working surface to the desired contour of the sheet to be produced, and adapted to act upon the unclamped area of the blank to simultaneously form and stretch the same throughout such area into the required shape without the coöperation of a complementary die.

3. In an apparatus for producing large sheet metal stampings of irregular shape, a work holder having side portions and cross connecting members, at the front and rear thereof, the cross connecting member at the rear being raised higher than the member at the front, in combination with a clamping die to coöperate with said side portions and cross connecting members to clamp the edges of the blank therebetween, and a stretching die to act upon the unclamped area of the blank to stretch the same into the required shape.

4. In an apparatus for producing large sheet stampings of irregular shape, a work holder having side portions and cross connecting members and a gripping rib in the upper surface of one of said members in combination with a clamping die to coöperate with said side portions and cross connecting members to clamp the edges of the blank therebetween, and a stretching die to act upon the unclamped area of the blank to stretch the same into the required shape.

5. In an apparatus for producing sheet metal stampings of irregular shape, a work holder having side portions and cross connecting members, and a retaining bar for the front cross member, in combination with a clamping die to coöperate with said side portions and cross connecting members to clamp the edges of the blank therebetween, and a stretching die to act upon the unclamped area of the blank to stretch the same into the required shape.

6. In an apparatus for producing large sheet metal stampings of irregular shape, a work holder, a coöperating clamp die, clamp levers carried by the work holder, means to rock said levers into clamping relation with the clamping die, and a stretching die.

7. In an apparatus for producing large sheet metal stampings of irregular shape, a work holder, a coöperating clamp die, clamp levers carried by the work holder, arms carried by the clamp die to engage said levers and rock the same into clamping engagement with the vertical edges of the blank, and a stretching die operating to stretch the blank into the desired shape.

8. In an apparatus for producing large sheet metal stampings of irregular shape, a work holder, a coöperating clamp die, clamp levers carried by the work holder, means normally operating on said levers to retract the same, means carried by the clamping die to force the levers into clamping relation with the vertical edges of the blank, and a stretching die operating to stretch the die into the desired shape.

9. In an apparatus for producing large sheet metal stampings of irregular shape, a work holder having clamping surfaces disposed in different horizontal planes, to receive the edges of the blank to be stamped, means to coöperate with said surfaces to clamp the blank edges thereto, and a stretching die to operate against the unclamped area of the blank to stretch the same into the desired shape.

10. In an apparatus for producing large sheet metal stampings of irregular shape, a work holder having cross connecting members having clamping surfaces disposed in different horizontal planes, to form supporting surfaces for the edges of the blank to be shaped, a clamping die coöperating with said members to clamp the blank edges therebetween, and a stretching die to operate against the unclamped area of the blank to stretch the same into the desired irregular shape.

11. In an apparatus for producing large sheet metal stampings of irregular shape, a work holder having cross connecting portions, one of said members extending to a higher horizontal plane than the other, said members forming a support for the edges of the blank to be stretched in combination with a clamping die coöperating with said cross members to clamp the edges of the blank therebetween, and a stretching die to act against the unclamped area of the blank to stretch the same into the required shape.

12. In an apparatus for producing large sheet metal stampings of irregular shape, a work holder to receive the sheet metal blank, a clamping die coöperating with said holder to clamp the edges of the blank, said clamping die having a hinged gate, and a stretching die to operate against the unclamped area of the blank to stretch the same into the desired irregular shape.

13. In an apparatus for producing large sheet metal stampings of irregular shape, a work holder to receive the sheet metal blank, a clamping die having front and rear portions arranged to coöperate with the work holder to clamp the edges of the blank and a forming and stretching die convexed on its working surface to the contour of the article to be produced and adapted to operate between said front and rear portions and against the unclamped area of the blank to stretch the same throughout such area into the desired irregular shape without the coöperation of a complementary die.

14. In an apparatus for producing large sheet metal stampings of irregular shape, a work holder to receive the sheet metal blank, a clamping die having front and rear portions arranged to coöperate with the work holder to clamp the edges of the blank, the front portion of the clamping die formed into a hinged gate, and a stretching die operating between said front and rear portions and against the unclamped area of the blank to stretch the same into the desired irregular shape.

In testimony whereof I have hereunto set my hand in the presence of the subscribing witnesses, on this 2nd day of February, A. D. 1915.

CLAYTON B. WEAVER.

Witnesses:
WM. F. MAGUIRE,
EDW. R. HESS.